(12) United States Patent
Shandilya et al.

(10) Patent No.: US 10,635,718 B1
(45) Date of Patent: Apr. 28, 2020

(54) METHOD AND SYSTEM FOR IMPLEMENTING A DATA COMPARE TOOL

(71) Applicant: JPMorgan Chase Bank, N.A., New York, NY (US)

(72) Inventors: Anupam Shandilya, Newark, DE (US); Raghav Singhania, Newark, DE (US); Bala Subbareddy Pagidela, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 195 days.

(21) Appl. No.: 15/783,143

(22) Filed: Oct. 13, 2017

Related U.S. Application Data

(60) Provisional application No. 62/407,727, filed on Oct. 13, 2016.

(51) Int. Cl.
*G06F 16/90* (2019.01)
*G06F 16/903* (2019.01)
*G06F 16/23* (2019.01)
*G06F 16/11* (2019.01)
*G06F 16/16* (2019.01)

(52) U.S. Cl.
CPC ...... *G06F 16/90335* (2019.01); *G06F 16/116* (2019.01); *G06F 16/168* (2019.01); *G06F 16/23* (2019.01)

(58) Field of Classification Search
CPC .................................................. G06F 16/254
USPC ........................................ 707/602, E17.117
See application file for complete search history.

(56) References Cited

U.S. PATENT DOCUMENTS

| 2010/0095348 | A1* | 4/2010 | Foster | G06F 21/6236 |
| | | | | 726/1 |
| 2015/0370871 | A1* | 12/2015 | Bender | G06F 16/254 |
| | | | | 707/602 |

* cited by examiner

*Primary Examiner* — Baoquoc N To
(74) *Attorney, Agent, or Firm* — Hunton Andrews Kurth LLP

(57) ABSTRACT

The invention relates to a data compare tool that compares data from a source server to data in a target server. According to an embodiment of the present invention, the data compare tool comprises at least one processor configured to: execute configuration data relating to database connection, source server, target server and comparison type data; receive a request, via the interactive user interface, to compare source data from a source server to target data in a target server; execute a comparison scenario based at least in part on the user input; extract data from a source server using the first set of credentials; transform the extracted data to a target format based on the target server; and compare the extracted data to the target data, accessed using the second set of credentials.

18 Claims, 6 Drawing Sheets

Data Comparator Tool

| | SERVER INFO | UserID | Password |
|---|---|---|---|
| 510 UnixServer Details | req4g3v.svr.us.bank.net | dga722 | ******** |
| 512 Source Database | Cognito ▼ | dga722 | ******** |
| 514 Target Database | Cognito ▼ | dga722 | ******** |
| 516 ALM Credentials | Mortgage_Banking ▼ | | |
| 518 Unix Folder Path | /download/automation/ABC/ | | |

Execute 520    View Results 522

Figure 5

Execution Summary — 610

| Total Scenarios | 5 |
|---|---|
| Total Pass Count | 5 |
| Total Fail Count | 0 |
| Execution Duration | 00:02:14 |

620

| TC Identifier | TestCase Name | Execution Status | Date | Detailed Result File | Remarks |
|---|---|---|---|---|---|
| ABC_Comments_20 | MB_Batch_CCW_STG_Delta_N_TC002_Val | Passed | 6/13/2017 15:48 | Differences File | |
| XYZ_CFPB_21 | MB_Batch_WebER_STG_Delta_P_TC001_V | Passed | 6/13/2017 15:49 | Differences File | |
| MMA_COLLFILE_DELTA_22 | MB_Batch_CCW_STG_Delta_N_TC002_Val | Passed | 6/13/2017 15:49 | Differences File | |
| DEF_Comments_23 | MB_Batch_CCW_STG_Delta_N_TC002_Val | Passed | 6/13/2017 15:50 | Differences File | |
| WWB_CFPB_24 | File2Table_TestCase | Passed | 6/13/2017 15:50 | Differences File | Source and Target data match |

Figure 6

METHOD AND SYSTEM FOR IMPLEMENTING A DATA COMPARE TOOL

CROSS REFERENCE TO RELATED APPLICATIONS

The application claims priority to U.S. Provisional Application 62/407,727, filed Oct. 13, 2016, the contents of which are incorporated herein in its entirety.

FIELD OF THE INVENTION

The present invention generally relates to a tool that compares data between sources in various formats and server locations.

BACKGROUND OF THE INVENTION

With current systems, comparing sets of data require multiple stages of complicated data extraction, aggregation and manipulation on different source and target systems of record (SORs) in order to achieve basic data comparison. As a result, such systems require extensive time and resources to maneuver through the multiple stages of data extraction, aggregation and manipulation on different source and target SORs while introducing possibilities of unforced errors, omissions and discrepancies in the data compare process. Current methodologies impact the quality of the comparison, thereby increasing risk for production issues and negatively impacting the delivery timelines and reputational risks to the entities.

Moreover, current tools do not provide the ability to effectively query Hadoop files. There is no mechanism that enables user to easily view and analyze the data from such unstructured data sources.

These and other drawbacks exist.

SUMMARY OF THE INVENTION

According to one embodiment, the invention relates to a data compare tool that compares data from a source server to data in a target server. The data compare tool comprises: a memory component; an interactive user interface that receives an user input; a computer server comprising at least one processor, coupled to the memory component and the interactive user interface, the at least one processor configured to perform the steps comprising: executing configuration data relating to database connection, source server, target server and comparison type data; receiving a request, via the interactive user interface, to compare source data from a source server to target data in a target server, the source data is in a first format and the target data is in a second format different from the first format, the source server is in a first location and requires a first set of credentials and the target server is in a second location different from the target server and requires a second set of credentials different from the first set of credentials; executing a comparison scenario based at least in part on the user input; extracting data from a source server using the first set of credentials; transforming, based on transformation logic, the extracted data to a target format based on the target server; comparing the extracted data to the target data, accessed using the second set of credentials; and transmitting a differences report, based on the comparison, to the interactive user interface.

The system may include a specially programmed computer system comprising one or more computer processors, mobile devices, electronic storage devices, and networks.

The invention also relates to computer implemented method that implements data compare tool that compares data from a source server to data in a target server. The method comprises the steps of: executing configuration data relating to database connection, source server, target server and comparison type data; receiving a request, via the interactive user interface, to compare source data from a source server to target data in a target server, the source data is in a first format and the target data is in a second format different from the first format, the source server is in a first location and requires a first set of credentials and the target server is in a second location different from the target server and requires a second set of credentials different from the first set of credentials; executing a comparison scenario based at least in part on the user input; extracting data from a source server using the first set of credentials; transforming, based on transformation logic, the extracted data to a target format based on the target server; comparing the extracted data to the target data, accessed using the second set of credentials; and transmitting a differences report, based on the comparison, to the interactive user interface.

The computer implemented system, method and medium described herein provide unique advantages to entities that compare massive amounts of data from various sources, including unstructured data sources. An embodiment of the present invention is directed to converting and comparing data in various formats and locations on the fly, in real-time. The system also provides added support for Extended Binary Coded Decimal Interchange Code (EBCDIC) files and added support to Hadoop databases. The Data Compare Tool addresses business needs by comparing large volumes of data, and provides support for various data sources. Moreover, various types of files may be added and supported as the need arises. Other advantages include improvements in efficiency, speed and user experience. These and other advantages will be described more fully in the following detailed description.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 5 is an exemplary illustration of a user interface, according to an embodiment of the present invention.

FIG. 6 is an exemplary illustration of a Results Interface, according to an embodiment of the present invention.

DESCRIPTION OF EMBODIMENTS OF THE INVENTION

Figure 1:
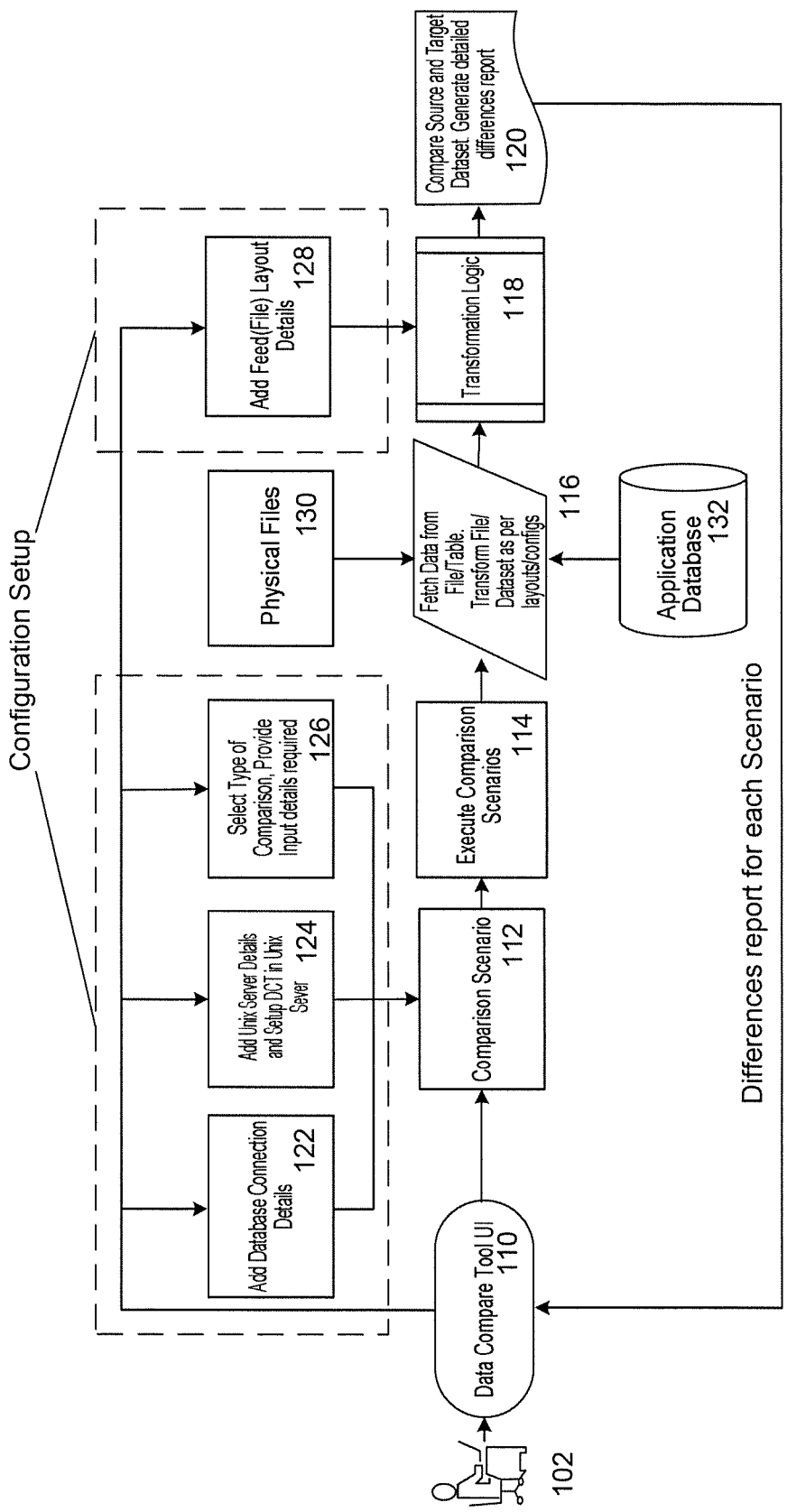
FIG. 1 is an exemplary execution flow diagram that illustrates a data compare process, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an innovative Data Compare Tool that compares data from various source locations in various formats. This may involve comparing data from a source server to data in a target server, where the source server and target server require separate credentials and authentication. According to an embodiment of the present invention, the data compare tool performs a comparison by accessing data from a source server and a target server, without having to download and store the data from the source server and the target server. In fact, the system of an embodiment of the present invention may be agnostic in terms of the source data and target data thereby providing flexibility and scalability. Moreover, the system does not require storage of large amounts of data to perform the comparison thereby improving efficiencies and conserving resources.

An embodiment of the present invention is directed to an innovative Data Compare Tool that enables comparison of massive volumes of data between Table to Table, File to Table and File to File, etc. The data to be compared may be in various disparate formats. The Data Compare Tool also supports conversion of Fixed Length, Record Separator (RS) separated, simple record Extended Binary Coded Decimal Interchange Code (EBCDIC) files to standard delimited before comparison. For example, a delimiter may represent a sequence of one or more characters used to specify the boundary between separate, independent regions in plain text or other data streams. According to an exemplary scenario, the Data Compare Tool may be wrapped in a user interface to support feed configurations and execution of test cases in batch mode. An embodiment of the present invention is directed to integrating with the various systems of record (SORs) in a manner that is agnostic to the source type, platform and further seamlessly perform Extract Transform Load (ETL) functions for the purposes of comparing sets of diverse data.

For example, the innovative Data Compare Tool queries the source and target data from the various sources on demand and performs a row by row comparison of each element in the row between the source and target. Results may be populated in a table format with details around specific failures and/or mismatches and general summary information including number of rows of data compared between source to target and vice versa and corresponding details. The table format is one example; other outputs may be supported.

The Data Compare Tool may extract data from source and target servers and then apply transformation logic and/or rules to format, truncate, concatenate and/or perform other functions for an optimal comparison of potentially disparate data. For example, the Data Compare Tool may convert received data in Boolean format to a binary format to perform comparison of disparate data sources. According to another example, a source may have a particular field in a first format and a target may have the same (or corresponding) field in an entirely different format.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only FIG. 1 is an exemplary execution flow diagram that illustrates a data compare process, according to an embodiment of the present invention. As shown in FIG. 1, a user 102 may access a Data Compare Tool user interface, at 110. User interface 110 may include an interactive user interface, e.g., Web Portal. Users may access the Data Compare Tool via various devices, including computers, mobile devices, including mobile phones, smart devices, etc.

User 102 may access Data Compare Tool UI 110 via a network communication or other form of communication. The network may be a wireless network, a wired network or any combination of wireless network and wired network. For example, the network may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11xx, or any other wired or wireless network for transmitting or receiving a data signal. Also, the network may support an Internet network, a wireless communication network, a cellular network, Bluetooth, or the like, or any combination thereof. The network may further include one, or any number of the exemplary types of networks mentioned above operating as a stand-alone network or in cooperation with each other. The network may utilize one or more protocols of one or more network elements to which it is communicatively coupled. The network may translate to or from other protocols to one or more protocols of network devices. Although the network is depicted as one network for simplicity, it should be appreciated that according to one or more embodiments, the network may comprise a plurality of interconnected networks, such as, for example, a service provider network, the Internet, a cellular network, corporate networks, or even home networks, or any of the types of networks mentioned above.

User 102 may provide a Comparison Scenario at 112, which may include identifying a source and a target. Comparison Scenario may also include comparison specifics, such as a comparison of a subset (e.g., two fields, 1000 fields, etc.) to another subset. Other restrictions may also be applied, e.g., limit to a predetermined amount of data, etc. An initial configuration setup may involve database connection details, at 122, and server details, at 124. Configuration setup may also include comparison details, at 126, and layout details, at 128. The configuration setup may be performed manually, automatically, dynamically and/or on-the-fly in real-time. The configuration setup may be performed initially and then updated as needed and as comparison specifics are modified. Comparison scenario may be executed at 114.

In this illustration, Source may include Physical Files 130 and Target may include Application Database 132. Other Sources and Targets of varying types and structures may be identified. As shown at 116, the process may fetch datasets from Physical Files 130 and Application Database 132.

Source and Target may be in various remote locations. Transformation Logic may be applied at 118.

Transformation Logic may represent logic and/or rules to format, truncate, concatenate and/or perform other functions for an optimal comparison of potentially disparate data. For example, the Data Compare Tool may convert received data in a first format to a second format to enable comparison of disparate data sources and formats. For example, in a source server, a date and time attribute may be stored as multiple fields—a first field for month, a second field for day, a third field for year and a fourth field for time. A target server may store a date and time attribute as a single field in mm/dd/yyyy and hh/mm/ss format. The Data Compare Tool may identify the date and time attribute in the source server and merge the multiple fields into a single field and corresponding target format. According to another example, the Data Compare Tool may be applied in a specific industry, such as mortgage banking. A source server may have a property field with values, such as single family, condo, townhouse, two unit, multi-family, etc. A target server may have the same or corresponding field with values, such as SF, CO, TH, 2U, MU, etc. The Data Compare Tool may be configured with transformation logic that identifies corresponding fields in disparate formats and applies transformation to enable optimal comparison. According to another example, Transformation Logic may recognize that a value of X of an attribute in a first table may have a corresponding value of Y of a corresponding attribute in a second table.

The process may involve comparing source 130 and target 132 and then generating a detailed differences report, at 120. In addition, an output, including the differences report, may be displayed on the UI, at 110.

The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Figure 2:
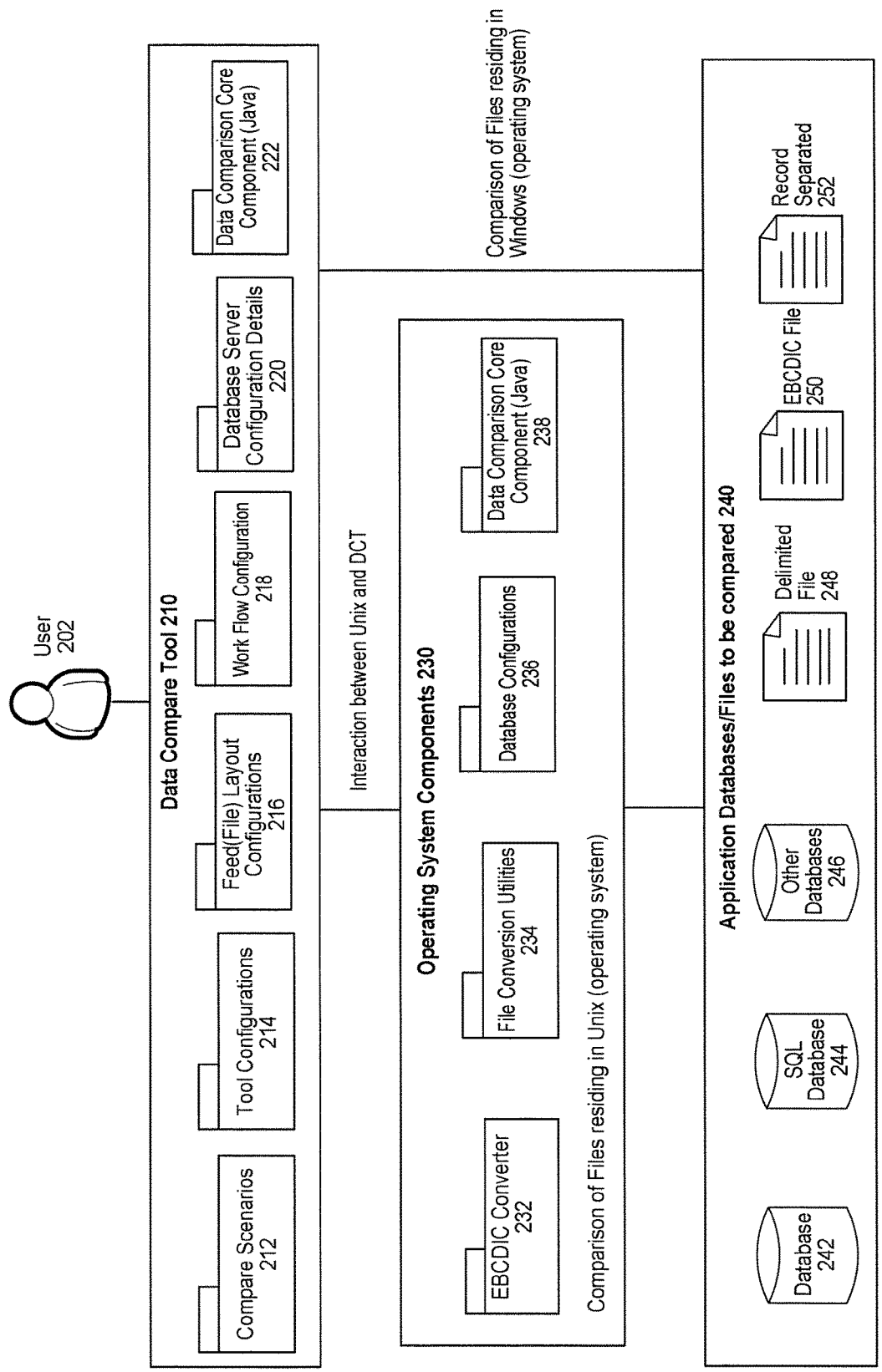
FIG. 2 is an exemplary illustration of a system architecture, according to an embodiment of the present invention.

FIG. 2 is an exemplary illustration of a system architecture, according to an embodiment of the present invention. The system architecture illustrates a Data Compare Tool 210, Unix/Linux Components 230 and Application Database and Files to be Compared 240. In this illustration, User 202 may interact with Data Compare Tool 220. Data Compare Tool 220 may include configuration data relating to Compare Scenarios 212, Tool Configurations 214, Feed (File) Layout Configurations 216, Work Flow Configurations 218, Database Server Configuration Details 220 and Data Comparison Core Component (e.g., Java) 222.

Operating System Components 230 may include Extended Binary Coded Decimal Interchange Code (EBCDIC) Converter 232, File Conversion Utilities 234, Database Configurations 236 and Data Comparison Core Component (e.g., Java) 238. In this example, operating system may represent Unix, Linux, etc.

Application Database and Files to be Compared 230 may include various types of Database and Files, including 242, 244, 246 as well as other types of data to be compared, including Delimited File 248, EBCDIC file 250 and Record Separated 252.

The Data Compare Tool of an embodiment of the present invention is directed to data extraction, aggregation and manipulation in a seamless integrated fashion. It further supports the ability to compare enormous volumes of systems of record (SORs) agnostic to the source type, platform. It seamlessly performs ETL functions in the backend while doing the data comparisons between the source and target SORs. The tool may be integrated with an Application Life Cycle Management tool for automated population of compare results. The tool is further architected to be extensible and add support for new SOR types and Platforms with minimal configuration efforts.

Figure 3:
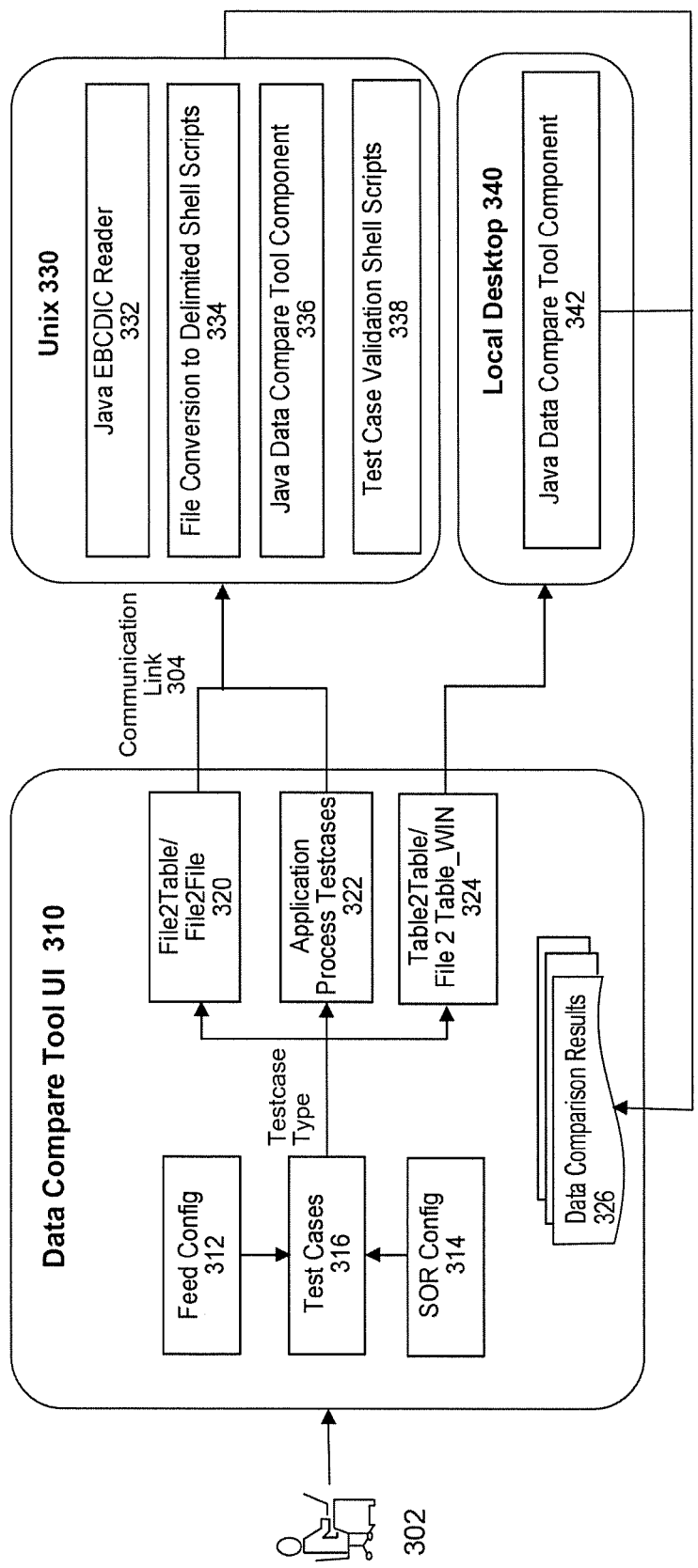
FIG. 3 is an exemplary illustration of a data compare tool overview, according to an embodiment of the present invention.

FIG. 3 is an exemplary illustration of a Data Compare Tool overview, according to an embodiment of the present invention. As shown in FIG. 3, a user 302 may launch a Data Compare Tool user interface (UI) 310, in accordance with the various embodiments of the present invention. UI 310 may also customized based on the type of user. For example, UI 310 may be specific for an administrative user, a technical user and even a non-technical user. The amount of complexity and available options and features via the UI 310 may be specific to the type of user.

Data Compare Tool may compare various sources and targets, including file to file; database to database as well as disparate sources and targets. The Data Compare Tool may also compare a subset of a file to another subset of a file (or other target, including database, etc.). Through Data Compare Tool UI 310, the user may perform comparison functions and tasks, including comparison of data between Table2Table, File2Table, File2File, File2Table, etc. Data Compare Tool may support various databases including DB2, TERADATA, Oracle, S Q L and Progress, Hadoop (open access driver). Also, Data Compare Tool may also support various operating systems, including Unix, Linux, Windows, etc. For example, the Data Compare Tool may perform a batch execution of test cases. For example, test cases may represent multiple scenarios to be executed. Test cases may include comparison specifics. For example, test cases may specify a comparison of a first set of fields in a file against a second set of fields in a table. Another example may compare the first five rows of a first file with a different set of rows in a second file. Data Compare Tool may further support conversions of Fixed Length, RS Separated, EBCDIC and XML Files. The system may provide detailed comparisons, including a Results Report that provides record counts between source and target. The system may update Status and Test execution results in an application development and testing tool, such as Application Lifecycle Management (ALM), for example. The system may also include Independent of UI Automation Tools, such as Quick Test Professional (QTP). Moreover, the system may be extended to new applications with minimal effort on configurations. Other tools and applications may be implemented; ALM and QTP are merely exemplary.

As shown in FIG. 3, Data Compare Tool UI 310 may receive Feed configuration data 312 and SOR configuration data 314 to build test cases 316, which may then be applied to comparison scenarios, shown by File2Table/File2File 320, Application Process Testcases 322 and Table2Table/File 2 Table_WIN 324. Other formats and scenarios may be implemented. According to an exemplary scenario, a Feed Configuration may be automatically populated by parsing a SOR file. Data Compare Tool UI 310 may communicate with Unix 330 and Local Desktop 340, via a network communication link 304, such as Plink, PSCP, etc. Unix 330 may include Java EBCDIC Reader 332, File Conversion to Delimited Shell Scripts 334, Java Data Compare Tool components 336 and Test Case Validation Shell Scripts 338. Local Desktop 340 may include Java Data Compare Tool Component 342. Other components may be supported by other operating systems, devices, etc. Data comparison results may be provided at 326.

According to an embodiment of the present invention, the system may implement a web services framework to facilitate use and distribution via hosting on a cloud server or other storage. An embodiment of the present invention may also support various technologies, including Cassandra, Mongo DB, other No SQL technologies, as well as support for JIRA. The embodiments of the present invention are not limited to the examples described herein and may be applied to various others applications and uses.

Figure 4:
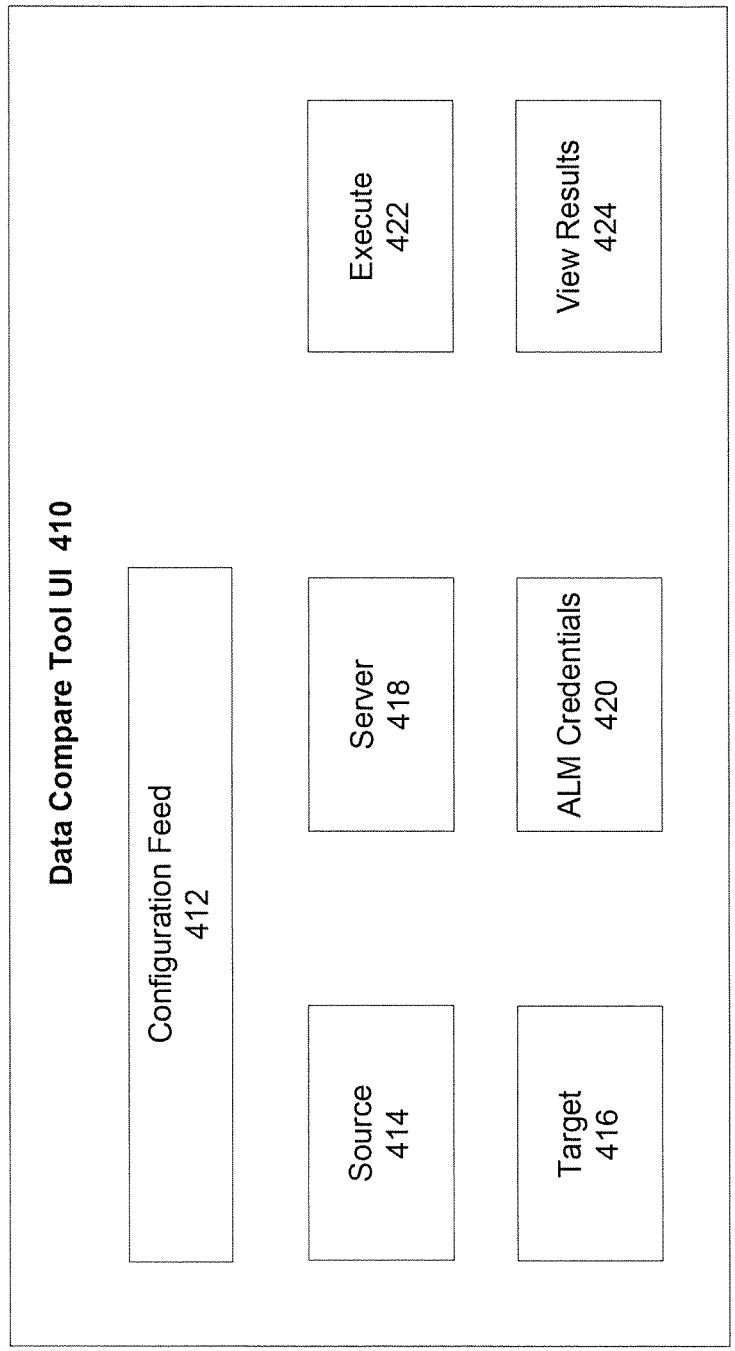
FIG. 4 is an exemplary illustration of Data Compare Tool UI, according to an embodiment of the present invention.

FIG. 4 is an exemplary illustration of Data Compare Tool UI, according to an embodiment of the present invention. UI 410 may include various modules that represent features and functions. Configuration Feed 412 may represent configuration source system feed details. Configuration Feed 412 may include various details, such as Feed Identifier, System Name, Feed Name, File Type, File Name, Control File, Database Type, etc.

UI 410 may also include source details, represented by 414, and target details, represented by 416. Source 414 may include source database identifier and user ID and password combination. Target 416 may include target database identifier and user ID and password combination. Server details may be represented by 418. Server 418 may include server details, such as a URL and user ID and password combination. Other server details may include operating system folder path. ALM Credentials may be presented by 420 and may include user ID and password combination.

FIG. 5 is an exemplary illustration of a user interface, according to an embodiment of the present invention. As shown in FIG. 5, the system may receive and/or access server details 510, source database 512, target database 514, credentials 516 along with corresponding credentials and/or authentication information, e.g., user identifier and password. For example, source database and target database may identify a database product that controls and manages user authentication and access. Also, folder path information 518 may be provided. From this interface, the user may execute at 520 and further view results in various formats, at 522. FIG. 5 is an example of a user interface; other functionality and features may be provided in accordance with the various embodiments of the present invention.

According to an exemplary embodiment of the present invention, the system may generate test cases. For example, test type may include Table2Table; File2Table; File2File and File2Table_Win. Other types and formats may be supported.

For example, Table2Table may support a comparison of data between two tables. In this example, fields required may include: Exec_Flag, TestCaseType as "Table2Table," Feed ID, TC_Name, TC_Description, Source Input (Source Query), Target Input (Target Query), Stop After n Clean Comparisons and QCTestSetPath (if applicable). File2Table may support a comparison of data between File in Unix and Table. Fields required may include: Enter Exec_Flag, TestCaseType as "File2Table," Feed ID, TC_Name, TC_Description, Source Input (Source File Name in Unix), Target Input (Target Query) and QCTestSetPath (if applicable). File2File may supports a comparison of data between two files. In this example, Fields required may include: Exec_Flag, TestCaseType as "File2File," Feed ID(for SourceInput), TC_Name, TC_Description, Source Input (Source File Name), Target Input (Target FileName), Target_FeedID and QCTestSetPath (if applicable). File2Table_Win may support a comparison of data between File in Windows and Table. In this scenario, Fields required may include: Exec_Flag, TestCaseType as "File2Table_Win," Feed ID, TC_Name, TC_Description, Source Input (Source File Name in Windows), Target Input (Target Query) and QCTestSetPath (if applicable).

FIG. 6 is an exemplary illustration of a Results Interface, according to an embodiment of the present invention. FIG. 6 illustrates an execution summary, at 610, that may include Total Scenarios, Total Pass Count, Total Fail Count and Execution Duration. Other metrics and factors may be generated and displayed. FIG. 6 also provides Detailed Results data as shown by 620. Section 620 provides Testcase identifier, Testcase Name, Execution Status, Date, a link to Detailed Results File and remarks.

Results Interface may also include a Differences File, according to an embodiment of the present invention. The Differences File may provide Summary data, Present in Both data and other variations. For example, Summary may provide Source and Target Inputs. Summary may also provide record counts of Source and Target along with Columns compared with % Pass rate. Present in Both may provide Rows which are matched by Primary columns and Highlights differences in RED Fill Color. Present in Target Only and Present in Source Only may provide Records which are found in one source and not in other. Other variations and features may be implemented.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in various databases and data stores. For example, the database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system implementing a data compare tool that compares data from a source server to data in a target server, the system comprising:
   a memory component;
   an interactive user interface that receives an user input;
   a computer server comprising at least one processor, coupled to the memory component and the interactive user interface, the at least one processor configured to perform the steps comprising:
   executing configuration data relating to database connection, source server, target server and comparison type data;
   receiving a request, via the interactive user interface, to compare source data from a source server to target data in a target server, the source data is in a first format and the target data is in a second format different from the first format, the source server is in a first location and requires a first set of credentials and the target server is in a second location different from the target server and requires a second set of credentials different from the first set of credentials;
   executing a comparison scenario based at least in part on the user input; wherein the comparison scenario comprises a comparison between a table to a table;
   extracting data from a source server using the first set of credentials;
   transforming, based on transformation logic, the extracted data to a target format based on the target server;

comparing the extracted data to the target data, accessed using the second set of credentials; and transmitting a differences report, based on the comparison, to the interactive user interface.

2. The computer implemented system of claim 1, wherein the comparison scenario comprises a comparison between a file to a table.

3. The computer implemented system of claim 1, wherein the comparison scenario comprises a comparison between a file to a file.

4. The computer implemented system of claim 1, wherein the comparison scenario comprises a comparison between a first predetermined subset of the source server to a second predetermined subset of the target server.

5. The computer implemented system of claim 1, wherein the first set of credentials comprises Unix server details.

6. The computer implemented system of claim 1, wherein the source server comprises physical files and the target server comprises an application database.

7. The computer implemented system of claim 1, wherein the transformation logic represents one or more rules that identifies a first field in the source server and a corresponding second field in the target server, wherein a first value in the first field is different in format than a second value in the second field.

8. The computer implemented system of claim 1, wherein the comparison scenario is executed in a batch mode.

9. The computer implemented system of claim 1, wherein the differences report comprises a total number of scenarios, a total pass count and a total fail count.

10. A computer implemented method implementing a data compare tool that compares data from a source server to data in a target server, the method comprising the steps of:

executing configuration data relating to database connection, source server, target server and comparison type data;

receiving a request, via the interactive user interface, to compare source data from a source server to target data in a target server, the source data is in a first format and the target data is in a second format different from the first format, the source server is in a first location and requires a first set of credentials and the target server is in a second location different from the target server and requires a second set of credentials different from the first set of credentials;

executing a comparison scenario based at least in part on the user input; wherein the comparison scenario comprises a comparison between a table to a table;

extracting data from a source server using the first set of credentials;

transforming, based on transformation logic, the extracted data to a target format based on the target server;

comparing the extracted data to the target data, accessed using the second set of credentials; and transmitting a differences report, based on the comparison, to the interactive user interface.

11. The computer implemented method of claim 10, wherein the comparison scenario comprises a comparison between a file to a table.

12. The computer implemented method of claim 10, wherein the comparison scenario comprises a comparison between a file to a file.

13. The computer implemented method of claim 10, wherein the comparison scenario comprises a comparison between a first predetermined subset of the source server to a second predetermined subset of the target server.

14. The computer implemented method of claim 10, wherein the first set of credentials comprises Unix server details.

15. The computer implemented method of claim 10, wherein the source server comprises physical files and the target server comprises an application database.

16. The computer implemented method of claim 10, wherein the transformation logic represents one or more rules that identifies a first field in the source server and a corresponding second field in the target server, wherein a first value in the first field is different in format than a second value in the second field.

17. The computer implemented method of claim 10, wherein the comparison scenario is executed in a batch mode.

18. The computer implemented method of claim 10, wherein the differences report comprises a total number of scenarios, a total pass count and a total fail count.

* * * * *